(12) United States Patent
Lounsbery

(10) Patent No.: US 6,553,337 B1
(45) Date of Patent: Apr. 22, 2003

(54) PARAMETERIZATION OF SUBDIVISION SURFACES

(75) Inventor: John M. Lounsbery, Bellevue, WA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/219,613

(22) Filed: Dec. 23, 1998

(51) Int. Cl.[7] .......................... G06F 19/00; G06F 17/50
(52) U.S. Cl. .............................. 703/2; 700/30; 700/31; 345/425; 345/430
(58) Field of Search .............................. 703/2; 700/28, 700/29, 30, 31, 97, 98; 345/419, 420, 425, 429, 430, 435

(56) References Cited

U.S. PATENT DOCUMENTS

| | | | | |
|---|---|---|---|---|
| 5,929,860 A | * | 7/1999 | Hoppe | 345/419 |
| 5,963,209 A | * | 10/1999 | Hoppe | 345/419 |
| 5,966,133 A | * | 10/1999 | Hoppe | 345/420 |
| 6,037,949 A | * | 3/2000 | DeRose et al. | 345/430 |
| 6,046,744 A | * | 4/2000 | Hoppe | 345/419 |
| 6,072,496 A | * | 6/2000 | Guenter et al. | 345/419 |
| 6,201,881 B1 | * | 3/2001 | Masuda et al. | 382/100 |

OTHER PUBLICATIONS

Aklemanet al., E. A New Paradigm for Changing Topology During Subdivision Modeling, The 8th Pacific Conference on Computer Graphics and Applications, 2000, pp. 192–201, May 2000.*

Kolundzija et al., B. Efficient Electromagnetic Modeling Based on Automated Meshing of Polygonal Surfaces, Antennas and Propagation Society International Symposium, IEEE, 2000, vol. 4, pp. 2294–2297, Aug. 2000.*

Ohbuchi et al., R. A Shape–Preserving Data Embedding Algorithm for NURBS Curves and Surfaces, Computer Graphics International, 1999, pp. 180–187, Jan. 1999.*

Mandal et al., C. Dynamic Smooth Subdivision Surfaces for Data Visualization, Visualization '97, 1997 pp. 371–377, Jan. 1997.*

Hughes et al., M. Effieient and Accurate Intererence Detection for Polynomial Deformation, Computer Animation '96, 1996, pp. 155–166, Jan. 1996*

Qin et al., H. Dynamic Catmull–Clark Subdivision Surfaces, IEEE Transactions on Visualization and Computer Graphics, vol. 4, No. 3, Jul.–Sep. 1998, pp. 215–229, Jul. 1998.*

Nasri, A.H. A Polygonal Approach for Interpolating Meshes of Curves by Subdivision Surfaces, Geometric Modeling and Processing 2000, Theory and Applications, 2000, pp. 262–273, Jul. 2000.*

Labsik et al., U. Using Most Isometric Parameterizations for Remeshing Polygonal Surfaces, Geometric Modeling and Processing 2000, Theory and Applications, 2000, pp. 220–228, Jul. 2000.*

(List continued on next page.)

Primary Examiner—Russell Frejd
(74) Attorney, Agent, or Firm—Staas & Halsey LLP

(57) ABSTRACT

A method for parameterizing a subdivision mesh in a computer system, the subdivision mesh comprising at least two faces, at least two faces sharing an edge, includes assigning a unique index for each of the at least two faces, assigning, for each of the at least two faces, a first (u) and a second (v) parameter to uniquely parameterize each point on a respective face, each respective u and v parameters for a respective face also being assigned the unique index for that respective face; and at a vertex shared by two faces sharing an edge, setting a first bound for each of the u and v parameters for each of the two faces, and for each of the same two faces, at a vertex not shared by the two faces, setting a second bound for each of the u and v parameters.

26 Claims, 8 Drawing Sheets

OTHER PUBLICATIONS

Volino et al., P. The Spherigon: A Simple Polygon Patch for Smoothing Quickly Your Polygonal Meshes, Computer Animation '98, 1998, pp. 72–78, Jan. 1998.*

Mark Halstead et al., "Efficient, Fair Interpolation Using Catmull–Clark Surfaces," Computer Graphics Proceedings, Annual Conference Series, 1993, pp. 35–44.

Hugues Hoppe et al., "Piecewise Smooth Surface Reconstruction,", Computer Graphics proceedings, Annual Conference Series, 1994, pp. 295–302.

James D. Foley et al., Computer Graphics Principles and Practice, Second Edition in C, Addison–Wesley Publishing Co., Reading, MA, 1997, Chapter 11, "Representing Curves and Surfaces," pp. 471–531.

* cited by examiner

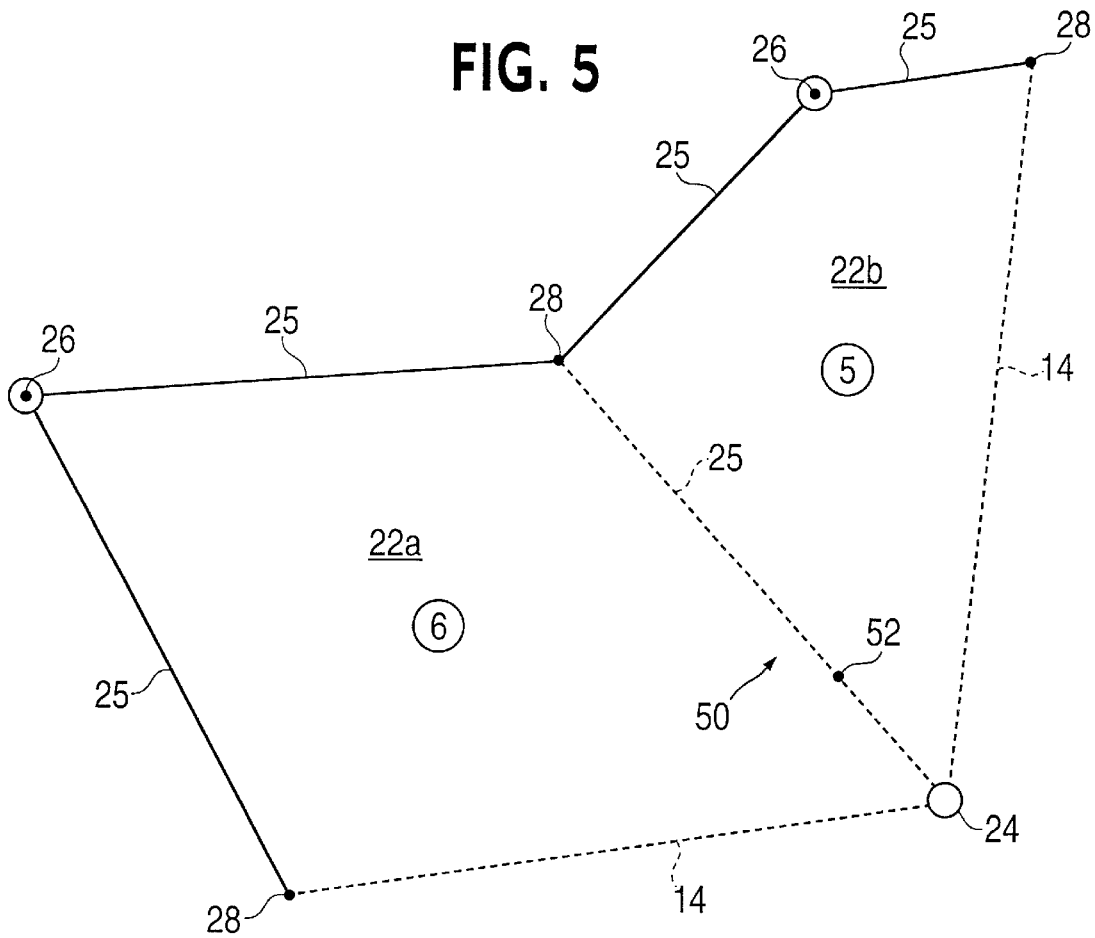

PARAMETERIZATION OF SUBDIVISION SURFACES

BACKGROUND

This invention relates to subdivision surfaces used for computer modeling.

Many computer applications generate or model surfaces and objects. Computer aided design (CAD) systems, computer animation tools, and computer graphics applications are often used to replicate real-world objects, or to generate novel objects. Many objects are not susceptible to exact mathematical description, and are often modeled interactively by a user employing artistic instead of scientific criteria. Computer systems require satisfactory methods of representing these objects and their surfaces. Since computers have finite storage capacity, an object cannot be modeled with an infinite number of coordinate points. Instead, various methods approximate object surfaces with segments such as planes, lines, and other object "primitives" that are easier to describe mathematically.

One method uses a polygon mesh, composed of a set of connected polygonally bounded faces. Rectilinear objects, such as boxes, can be easily modeled with polygon meshes. Representing objects with curved surfaces using a polygon mesh requires approximating a curved surface by a number of smaller faces. Error between the approximated representation and the real object can be made arbitrarily small by using more polygons. Using more polygons requires greater computer memory storage and computation capacity.

Another modeling method uses sets of parametric polynomial surface patches to represent a curved object. By using inherently curved surface segments, the method enables a computer modeler to represent arbitrary curved surfaces very accurately. Typically, an object is broken down into a set of connected surface patches, each patch is modeled with a parametric polynomial surface, and the surfaces are connected together to yield the final object representation. The algorithms for employing parametric polynomial surfaces are more complex than those for polygons, but fewer polynomial surface patches are typically required to approximate a curved surface to a given accuracy then with polygon meshes.

One method of improving the accuracy of a polygonal mesh approximation is to iteratively subdivide the faces of the initial mesh into smaller polygons or surface patches according to a set of rules. The initial mesh serves as a rough approximation of the real object and each successive iteration of subdivision serves to refine the approximation of the model to the real object. The surface resulting from an infinite subdivision of a mesh, is known as a subdivision surface.

A polygonal mesh, and corresponding rules of subdivision can be used for more than just modeling the shape of an object. The resulting subdivision surface can be used as the framework on which the surface of the object is smoothly painted, or to which textures of the object's surfaces are assigned. Furthermore, subdivision surfaces may be used as the basis for drawing curves on a surface, either entirely within one polygon of the mesh or across several polygons. When using subdivision surfaces as a framework with which to draw, paint, shape or otherwise describe a surface it is often desirable to have smooth transitions of parameter values when moving from one position on a subdivision surface to another.

SUMMARY

In general, in a first aspect, the invention features a method for parameterizing a subdivision mesh in a computer system, the subdivision mesh comprising at least two faces, at least two faces sharing an edge, the method including assigning a unique index to each of the at least two faces, assigning, for each of the at least two faces, a first (u) and a second (v) parameter, and at a vertex shared by two faces sharing an edge, setting a first bound for each of the u and v parameters for each of the two faces, and for each of the same two faces, at a respective vertex not shared by the two faces, setting a second bound for each of the u and v parameters.

Embodiments of the invention may include one or more of the following features. The first bound can be the same for the u and v parameters for each of the two faces, and the second bound can be the same for the u and v parameters for each of the two faces. The first bound can be a minimum bound and the second bound can be a maximum bound for each of the parameters u and v. The first bound can be a maximum bound and the second bound can be a minimum bound for each of the parameters u and v. The first bound can be 0 and the second bound can be 1. Or, the first bound can be 1 and the second bound can be 0. Each face can be a quad. Each non-shared vertex can be diagonal from and opposite of the respective shared vertex for each face. For substantially all faces of the subdivision mesh, the method can further include assigning a unique index for substantially all of the faces, assigning, for substantially all of the faces, a first (u) and a second (v) parameter, and for each pair of faces sharing an edge, at a vertex shared by two faces, setting a first bound for each of the u and v parameters for each of the two faces, and for each of the same two faces, at a respective vertex not shared by the two faces, setting a second bound for each of the u and v parameters. The method can further include determining whether a point lies on a boundary between two or more coupled faces, and assigning, to the shared point, the u and v parameters and the index from the coupled face which has the lowest or the highest index.

A point on a local face can be parameterized by initially parameterizing a point on a local face using a first adjacent parameter value and a second adjacent parameter value determined from the u and v parameters of an adjacent face, and determining a local parameterization of the point by assigning to the point the index of the local face, and swapping the first adjacent parameter value to become the second local parameter value, and swapping the second adjacent parameter value to become the first local parameter value. If the first local parameter value is greater than the maximum bound of the second parameter of the adjacent face, then the first local parameter value can be subtracted from twice the maximum bound of the second parameter of the adjacent face, and the result can be assigned as the new first local parameter value. If the first local parameter value is less than the minimum bound of the second parameter of the adjacent face, then the first local parameter value can be subtracted from the minimum bound of the second parameter of the adjacent face, and the result can be assigned as the new first local parameter value. If the second local parameter value is greater than the maximum bound of the first parameter of the adjacent face, then the second local parameter value can be subtracted from twice the maximum bound of the first parameter of the adjacent face, and the result can be assigned as the new second local parameter value. And if the second local parameter value is less than the minimum bound of the first parameter of the adjacent face, then the second local parameter value can be subtracted from the minimum value of the first parameter of the adjacent face, and the result can be assigned as the new second local parameter value.

In general, in another aspect, the invention features a storage device tangibly storing a control program, the control program, when coupled to a control device, operating the control device to perform the function of parameterizing a subdivision mesh, the subdivision mesh comprising at least two faces, at least two faces sharing an edge, by assigning a unique index for each of the at least two faces, assigning, for each of the at least two faces, a first (u) and a second (v) parameter, and at a vertex shared by two faces sharing an edge, setting a first bound for each of the u and v parameters for each of the two faces, and for each of the same two faces, at a respective vertex not shared by the two faces, setting a second bound for each of the u and v parameters.

The advantages of the invention may include one or more of the following. Subdivision surfaces can be continuously parameterized. By continuously parameterizing a subdivision surface, many computer graphics techniques, such as texture maps, surface painting, and description of a curve on a surface, can be used with subdivision surfaces. Also, parameters of points in adjacent faces of a subdivision mesh can be rapidly and easily determined as one moves around the mesh.

Other features and advantages of the invention will become apparent from the following description and from the claims.

DRAWINGS

FIG. 5 is a view of two adjacent basis subdivision faces.

DESCRIPTION

Figure 1:
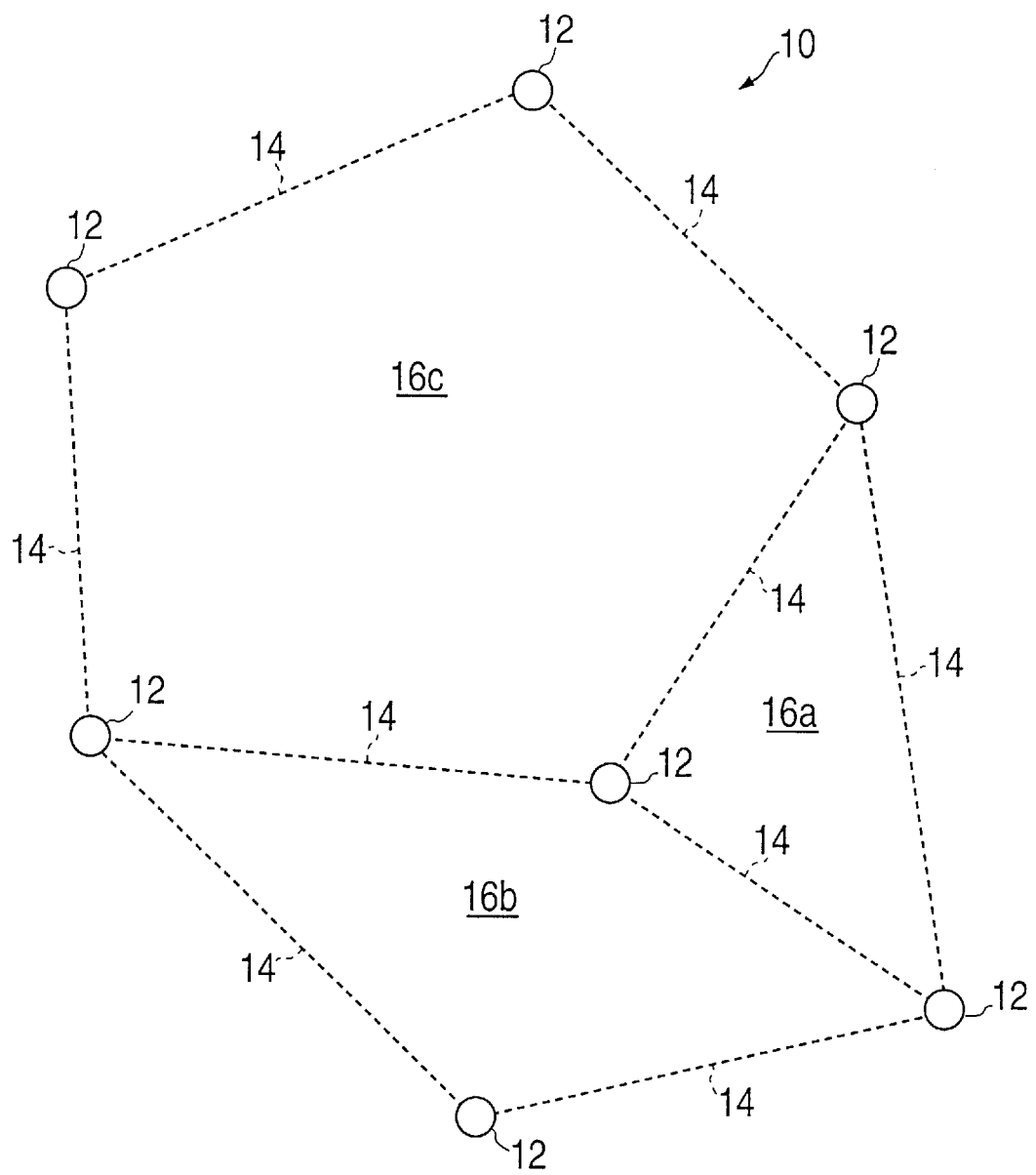
FIG. 1 is a view of an initial non-uniform mesh.

As shown in FIG. 1, an initial mesh 10 is constructed by joining initial vertices 12 with initial curves 14 to form initial faces 16. Initial curves 14 may be straight lines, in which case initial mesh 10 defines a set of initial faces 16 that are polygons. If the initial curves 14 in FIG. 1 are straight lines, they define an irregular triangle, an irregular quadrangle, and an irregular pentagon as initial faces 16a, 16b, and 16c. Alternatively, initial curves 14 may be parametric curves that connect initial vertices 10, in which case initial mesh 10 defines a set of initial faces 16 that are parametric polynomial surface patches. The curves used to generate polynomial surface patches may be non-uniform rational B-splines curves (NURBS). Alternatively, Catmull-Clark rules that generalize B-spline patches (so that the real object to be modeled is represented by a single surface rather than a collection of independent B-spline patches) may be used to construct the polynomial surface patches. Other forms of curves and surfaces, such as Hermite, Bézier, uniform B-splines, non-rational B-splines and other spline forms such as Catmull-Rom (Overhauser splines), uniformly shaped B-splines, and Kochanek-Bartels splines, among others, may also be used.

Initial mesh 10 may be over a surface of any topological type and may be constructed such that initial faces 16 have any number of sides, or vertices of any valence. To parameterize the surface defined by initial mesh 10, and its subdivision surface, initial mesh 10 should, in general, be orientable; thus, Möbius strips are not generally uniformly parameterizable with this method, but may be independently parameterized by breaking them up into appropriate separate sections. If initial mesh 10 is composed of uniform polygons that all have the same number of sides it may be parameterized directly or it may be subdivided one or more times before being parameterized. If initial mesh 10 is composed of non-uniform polygons it is not generally parameterized directly. Rather, initial mesh 10 is subdivided one or more times to normalize all faces to have the same number of sides before the mesh is parameterized. Parameterization then can begin on a subdivision mesh composed of basis faces that all have the same number of sides.

Figure 2:
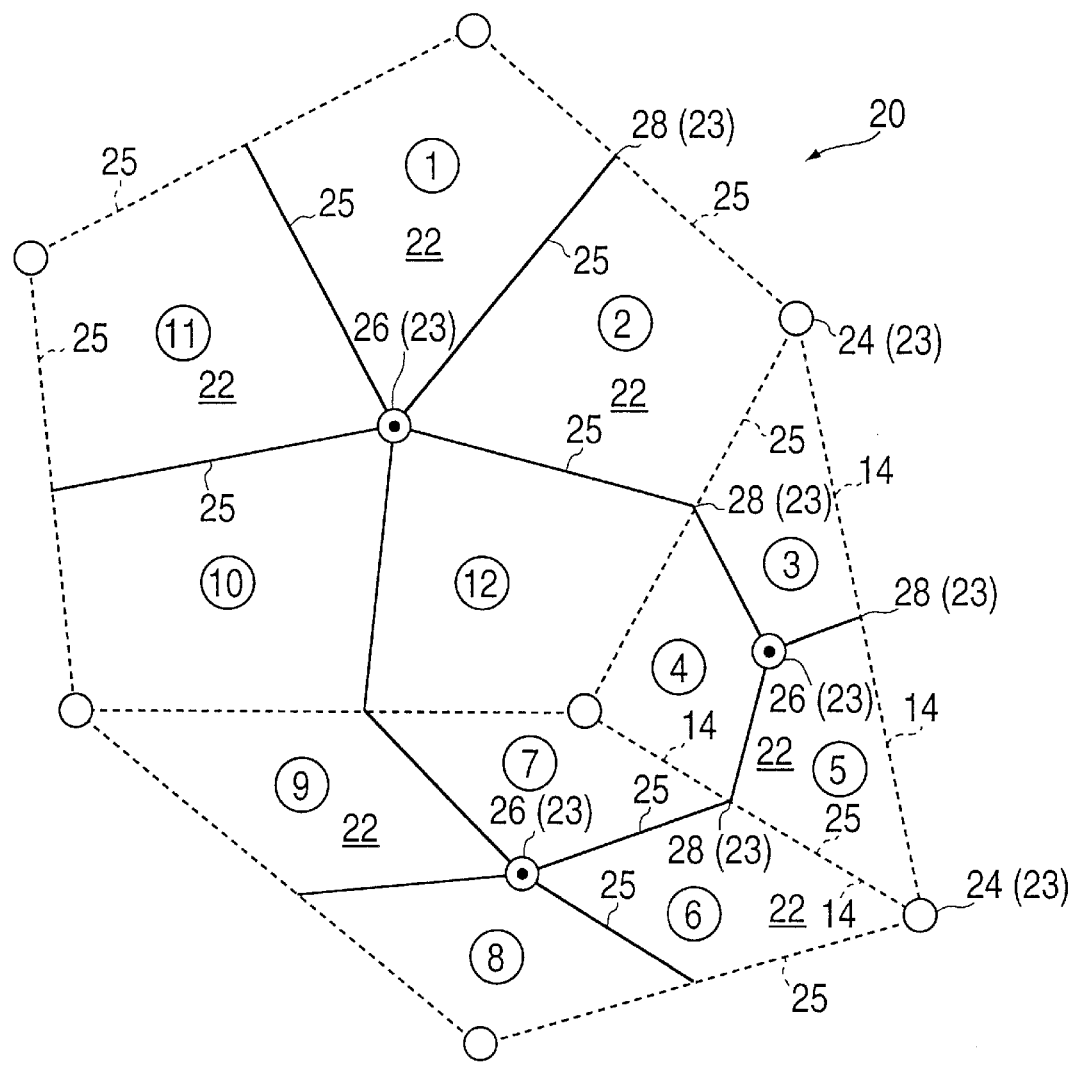
FIG. 2 is a view of an initial non-uniform mesh subdivided into basis faces.

With reference to FIGS. 1 and 2, a non-uniform initial mesh 10 can be subdivided to yield a basis mesh 20. Basis mesh 20 is composed of basis faces 22. Basis faces 22 may be composed of either polygons or parametric polynomial surface patches. Each basis face 22 has four sides 25 with endpoints at four basis vertices 23, where these four basis vertices include one home vertex 24 corresponding to an initial vertex of the initial mesh 10, a peak vertex 26 at the barycenter of an initial face 16, and two vertices 28 at the midpoints of two initial curves 14 of the initial mesh 10.

It should be noted that any intermediate subdivided mesh, at any level of subdivision, can be considered a "basis" mesh for purposes of the following procedures.

As shown in FIG. 2, the four sided basis faces 22 of basis mesh 20 are used as piecewise domain faces for the parameterization of basis mesh 20. Each subdivision face 22 is assigned a unique face index i, so that the subdivision faces 22 of basis mesh 20 are rank orderable. The index of each face is shown by a circled number on the face. In addition, a local $u_i$, $v_i$ coordinate system is assigned to each subdivision face 22. Thus, the parameterization of basis mesh 20 is piecewise global, meaning that it covers the entire surface, but is made from discrete local sections defined by the basis faces 22.

Figure 3:
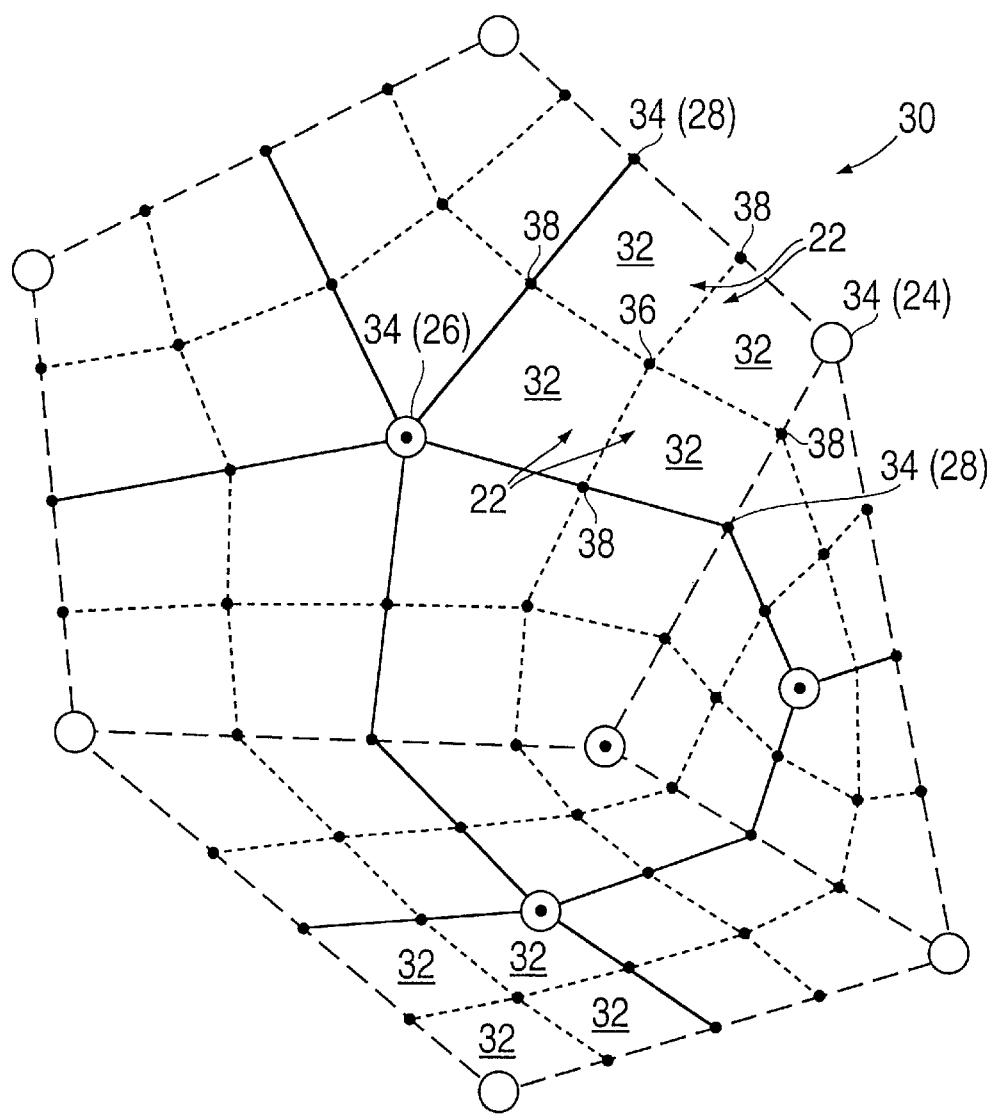
FIG. 3 is a view of the basis faces of FIG. 2 subdivided into first subdivision faces.

As shown in FIG. 3, the subdivision process can be iteratively repeated to yield a finer and finer subdivision mesh. FIG. 3 shows a first subdivision mesh 30 derived by subdividing basis mesh 20. First mesh 30 is composed of sets of first subdivision faces 32, whereby a subdivision face 22 is subdivided into four first subdivision faces 32. First subdivision faces 32 may be either polygons or parametric polynomial surface patches. Each first subdivision face 32 here also has four sides, with one home vertex 34 corresponding to a basis vertex 23 of the basis mesh 20, a center vertex 36 at the center of a basis face 22, and two vertices 38 at the midpoints of the sides of basis face 22.

Figure 4:
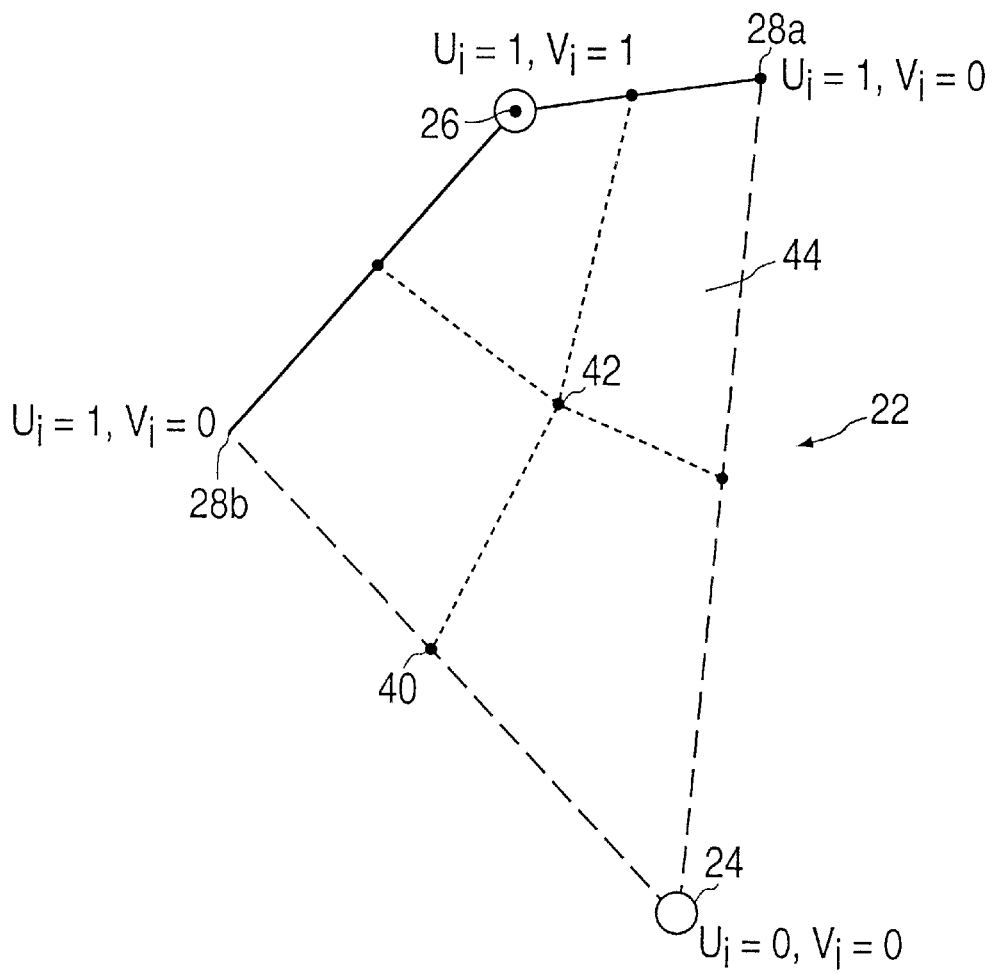
FIG. 4 is a view of a basis face subdivided into first subdivision faces.

As shown in FIGS. 2 and 4, the home vertex 24 and center vertex 26 of a basis face 22 can be used to consistently orient the local $u_i$, $v_i$ coordinate system on each basis face 22. The origin ($u_i=0$, $v_i=0$) of the $i^{th}$ basis face 22 corresponds to the $i^{th}$ home vertex 24 and the point ($u_i=1$, $v_i=1$) of the $i^{th}$ basis face 22 corresponds to the $i^{th}$ center vertex 26. The u-axis ($u_i=1$, $v_i=0$) of the $i^{th}$ basis face 22 corresponds to the next vertex 28a counter-clockwise around $i^{th}$ basis face 22 from the origin ($u_i=0$, $v_i=0$); which can be called a first axis vertex 28a. The v-axis ($u_i=0$, $v_i=1$) of the $i^{th}$ basis face 22 corresponds to the next vertex 28b clockwise from the origin ($u_i=0$, $v_i=0$) around $i^{th}$ basis face 22; which can be called a second axis vertex 28b. All basis faces 22 are similarly parameterized using their face index, their home vertex, and their center vertex. This choice of coordinate parameter system is convenient but arbitrary; other parameterizations can be used, for example, from (0,0) to (2,2), without any loss of function or generality. As the mesh is iteratively subdivided, each local coordinate system, specific to a particular basis face 22, is maintained.

FIG. 4, with basis face i=5 from FIG. 2, shows how the iterative process of subdivision can be used to carry the parameterization of each basis face 22 to each of its points. For example, point 40 will have parameters ($u_5=0$, $v_5=0.5$), point 42 will have parameters ($u_5=0.5$, $v_5=0.5$), and point 44 will have parameters ($u_5=0.75$, $v_5=0.25$). As the basis faces are further subdivided, more points are parameterized, and the limit of the subdivision process provides a continuous parameterization over the limit surface. This parameterization is unambiguous for every point not on a boundary between different basis faces. Midpoints along edges of faces can be generally given the average of the varying parameter along the edge, but other sorts of parameterizations can be used, again without any loss of function or generality.

As shown in FIG. 5, along a boundary 50 between two or more basis faces 22a, 22b, for example with face indices i=5, i=6, respectively, from FIG. 2, it may be necessary to choose one of several possible parameterizations in order to uniquely define every point on the basis mesh 20. For such points the parameterization derived from the face with the smallest face index can be chosen to accomplish this goal. For example, although point 52 along boundary 50 may be defined either as ($u_6=0.25$, $v_6=0$) or ($u_5=0$, $v_5=0.25$), one can choose ($u_5=0$, $v_5=0.25$) to rule out ambiguity. However, the parameterization of the point based upon the other basis face could also be used, so that the point would have parameters ($u_6=0.25$, $v_6=0$).

Each basis face 20a, 22b therefore can have its own local $u_i$, $v_i$ coordinate system for parameterizing all points within itself, and have a simple rule for determining the appropriate parameters on any boundary between basis faces. It then becomes a simple matter to keep track of the parameterization when crossing a boundary 50 between two basis faces 20a, 20b. When crossing from a position ($u_i$, $v_i$) on basis face $f_i$ with a local coordinate system $u_i$, $v_i$ to an adjacent (or substantially equal) position ($u_j$, $v_j$) on basis face $f_j$, the new local coordinate system becomes $u_j$, $v_j$. The parameters for the point at which the boundary is crossed are obtained by merely swapping the old parameter values ($u_i$, $v_i$) with the new parameter values: $u_j:=v_i$ and $v_j:=u_i$.

As shown in FIG. 2 and FIG. 5, when crossing between basis faces 22 at a vertex 23 of a basis face, coordinates must be swapped only in certain cases. When crossing at either a home vertex 24 or a center vertex 26 (which are vertices of the initial mesh 10, and the centers of initial faces 16, respectively), there is no need to swap coordinates, as the values will remain at (0, 0) in the case of home vertices 24 and will remain at (1, 1) in the case of center vertices 26. In the remaining cases of boundary crossing at a vertex, when crossing between basis faces 22 that share a side, coordinates are swapped, and when crossing between basis faces 22 that share only a vertex 23 but not a side, coordinates are not swapped. Swapping or retaining coordinates when crossing a boundary gives an efficient method of determining the new coordinates without roundoff error.

Figure 6A:
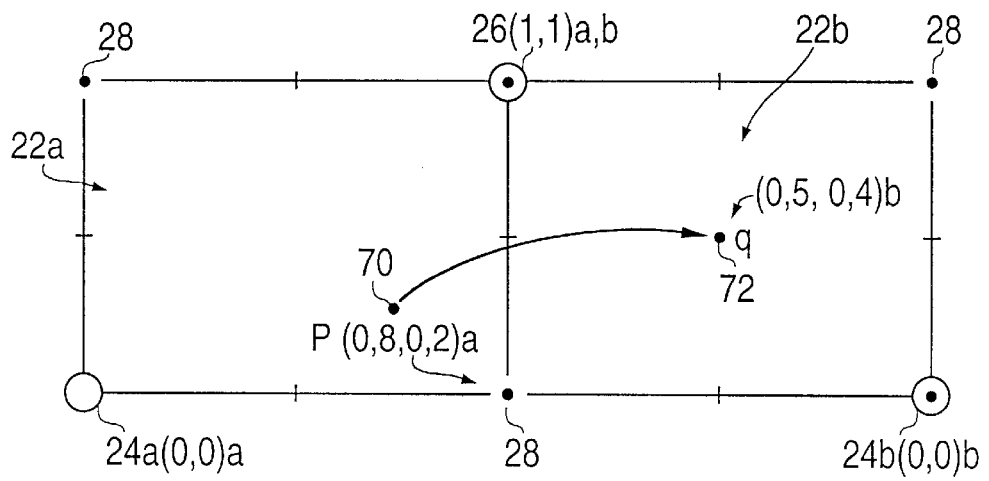
FIGS. 6a and 6b are schematic views of two adjacent basis subdivision faces.
Figure 6B:
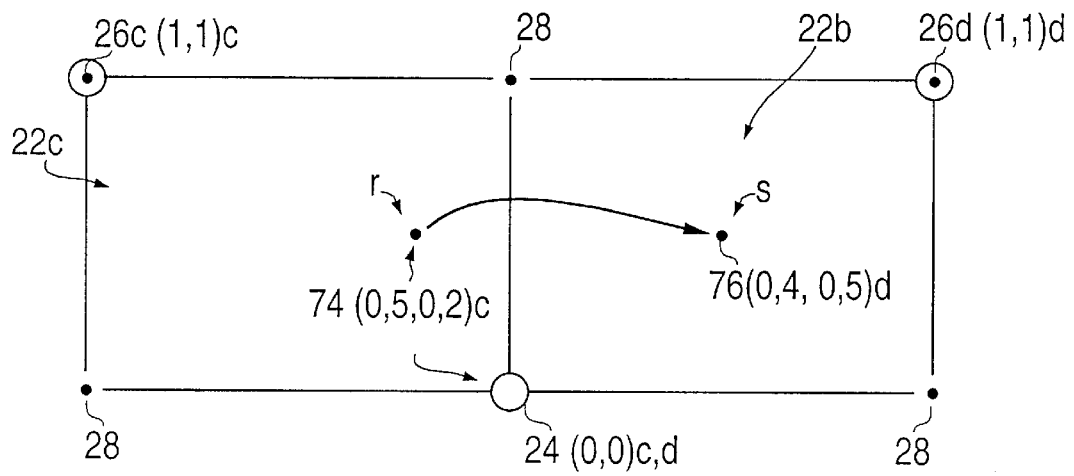

Further, as shown in FIGS. 6a and 6b, the basic parameterization scheme for each basis face allows for simple determinations of the parameters when jumping across a boundary of one face to a point on the interior of another adjacent face. FIGS. 6a and 6b are each a schematic view of two adjacent basis faces 22a and 22b, and 22c and 22d, respectively in the rectilinear space of their adjacent parameterizations. In FIG. 6a, adjacent basis faces 22a and 22b share a center vertex 26 (having parameters (1, 1) for both faces), but have different home vertices 24a and 24b (having parameters ($0_a$, $0_a$) and ($0_b$, $0_b$) respectively). In FIG. 6a, one might want to move from point p (point 70 in basis face 22a) to point q (point 72 in basis face 22b), where point p has coordinates ($0.8_a$, $0.2_a$) and where point q has coordinates ($0.5_b$, $0.4_b$). One can first determine what the coordinates of point q would be if extrapolated from the coordinate system of face 22a to that of face 22b: that is, point q would have coordinates of ($1.6_a$, $0.5_a$). For any such point where the extrapolated parameterization has a parameter (e.g., 1.6) greater than the maximum bound for that face (e.g., 1.0), one first subtracts that parameter from the twice the maximum bound for the face (e.g., 2.0). In other words, here, the calculation would be 2.0−1.6=0.4. Then (or beforehand) one swaps the parameters to yield the parameterization for the correct coordinates in the second face 22b, or ($0.5_b$, $0.4_b$).

Similarly in the other case shown in FIG. 6b, adjacent basis faces 22c and 22d share a common home vertex 24 (having parameters (0, 0) for both faces), but have different center vertices 24c and 24d (having parameters ($1_c$, $1_c$) and ($1_d$, $1_d$) respectively). In FIG. 6b, one might want to move from point r (point 74 in basis face 22c) to point s (point 76 in basis face 22d), where point r has coordinates ($0.5_c$, $0.2_c$) and where point s has coordinates ($0.4_d$, $0.5_d$). Again, one can first determine what the coordinates of point s would be if extrapolated from the coordinate system of face 22c onto face 22d: that is, point s would have coordinates of ($0.5_a$, $-0.4_a$). For any such point where the extrapolated parameterization has a parameter (e.g., −0.4) less than minimum bound for the face (e.g., 0.0), one subtracts that parameter from the minimum bound for the face (e.g., 0.0−0.4 equals 0.4), and then (or beforehand) one swaps the parameters to yield the parameterization for the correct coordinates in the second face 22d, or ($0.4_d$, $0.5_d$). These simple transformation and swapping rules allow simple, quick, and efficient calculation of the local parameters of points as one moves around from face to face in a subdivision mesh.

Figure 7:
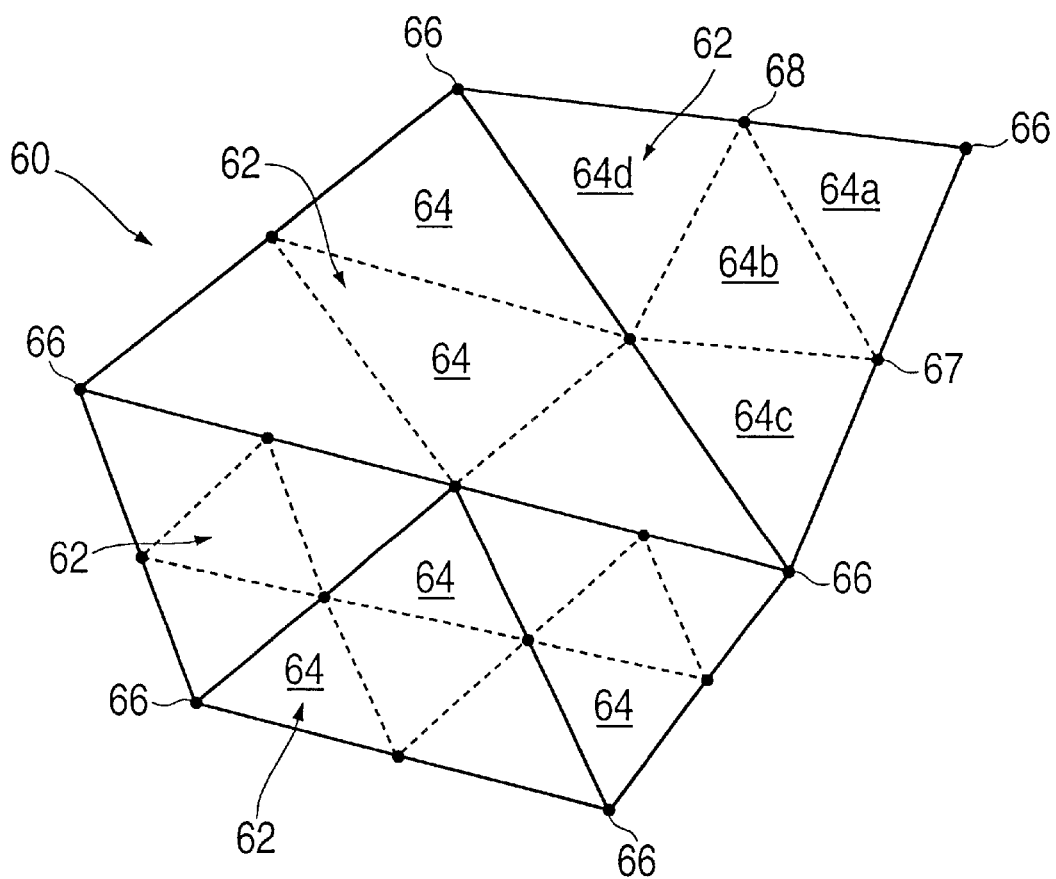
FIG. 7 is a view of a triangular mesh subdivided into triangular basis subdivision surfaces.

As shown in FIG. 7, the described method of parameterizing a subdivision surface can apply to triangular schemes in addition to quadrangular schemes. Generally in triangular meshes, the parameterization begins with a basis mesh 60 composed of triangular basis faces 62. Basis faces 62 are shown by solid lines in FIG. 6. The basis mesh 60 may be derived from an initial mesh of non-uniform polygonal surface segments or parametric surface patches, or may itself be the original mesh of the surface.

For triangular subdivision schemes, unlike quad schemes, barycentric coordinates ($u_i$, $v_i$, $w_i$) where ($u_i+v_i+w_i$)=1, are used to parameterize the points on each subdivision face. Coordinates are assigned once the basis faces 62 are subdivided into first subdivision faces 64, shown by the dashed lines in FIG. 6. The method of parameterizing the subdivision surface begins by assigning unique first subdivision face indices i to the first subdivision faces 64, such that the first subdivision faces are rank order able. For first subdivision faces 64a with a home vertex 66 common to a vertex of the basis mesh 60, the home vertex is parameterized as ($u_i=1$, $v_i=0$, $w_i=0$), the vertex 67 clockwise around the subdivision face from the home vertex 66 is parameterized as ($u_i=0$, $v_i=0$, $w_i=1$) and the vertex 68 counter-clockwise around the subdivision face from the home vertex 66 is parameterized as ($u_i=0$, $v_i=1$, $w_i=0$). First subdivision faces 64b with no vertex in common with a vertex of basis mesh 60 are similarly parameterized. The vertices of these subdivision faces 64b may be ordered in a consistent manner by choosing, for example, the vertex opposite the first subdivision face with the lowest face index as the home vertex. Subdivision of the first and subsequent subdivision faces may then proceed, and the parameterization of subsequent points is derived from the first subdivision face indices and first subdivision vertex parameters. For points on boundaries between first subdivision faces that could be parameterized in more than one way, the parameterization corresponding to the first subdivision face with the lower index is chosen when definiteness, and lack of ambiguity is required. Swapping rules similar to those used for quad meshes can be used to determine the parameterization of a point when moving between neighboring first subdivision faces.

The methods described above can be implemented in special-purpose circuitry, general-purpose circuitry (such as programmable microprocessors) operating under the control of program instructions, or in any combination of such apparatus. However, the methods are not limited to any particular circuitry or program configuration; they can find applicability in any computing or processing environment that can be used for the manipulation of meshes used for constructing surfaces of objects.

Figure 8:
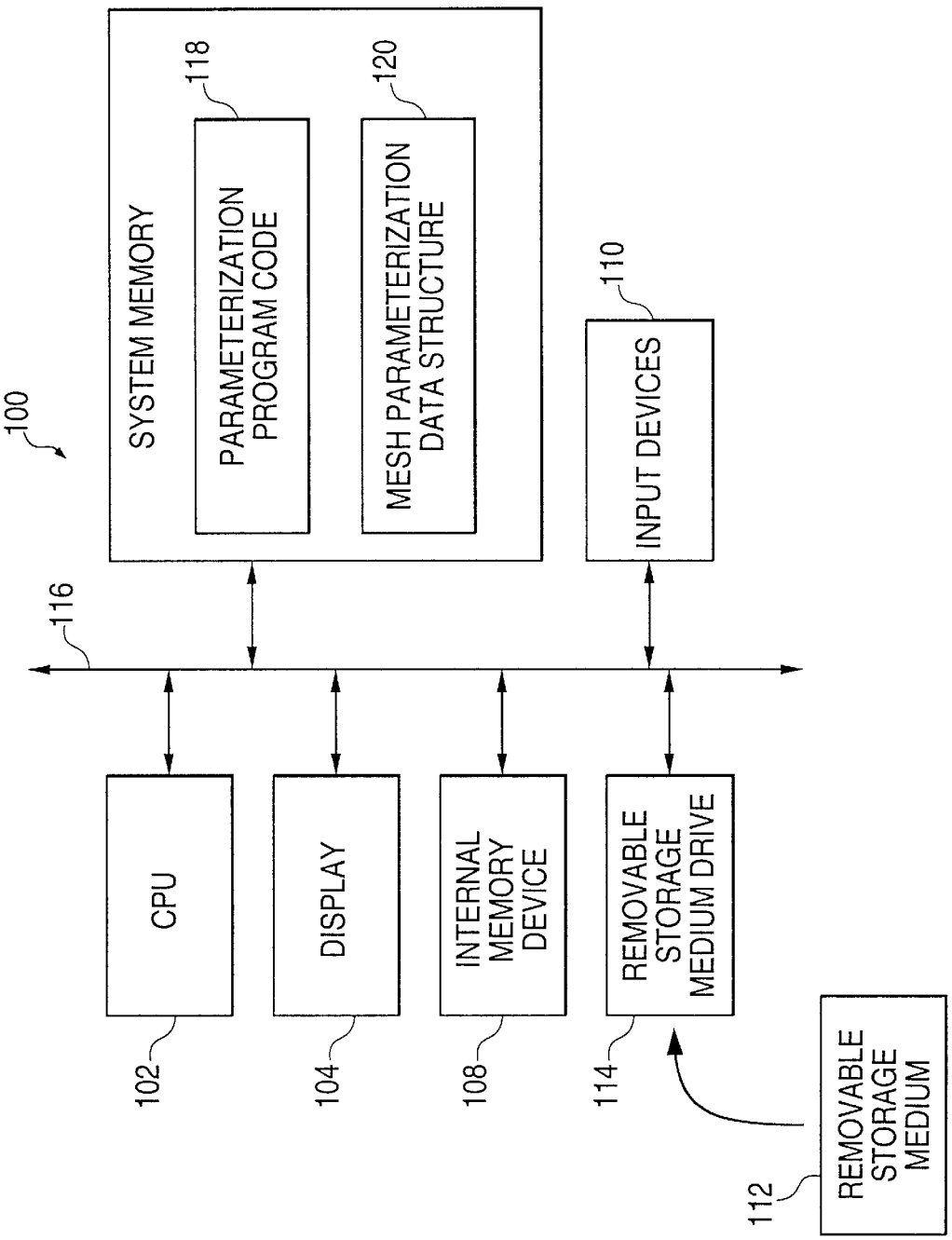
FIG. 8 is a schematic diagram of a computer system for parameterizing subdivision meshes.

As shown in FIG. 8, the methods can be implemented in computer programs executing on programmable circuitry that can include a processor, a storage medium readable by the processor (including volatile or non-volatile memory and/or storage elements), one or more input device, and one or more output devices. Program code can be applied to data entered using the input device to perform the functions described and to generate output information. The output information can be applied to the one or more output devices.

A computer system 100 for performing parameterization operations upon meshes includes a CPU 102, a display 104, a system memory 106, an internal memory device (e.g., hard disk drive) 108, a user input device(s) 110 (e.g., keyboard and mouse), and a removable storage medium 112 (e.g., floppy, tape, or CD-ROM) read by an appropriate drive 114, all coupled by one or more bus lines 116. Code for a parameterization program 118 can be stored on removable storage medium 112, and then introduced to computer system 100 through drive 114 to be either temporarily stored in system memory 106 or permanently stored in internal memory device 108. CPU 102 can then use the introduced parameterization operations program 118 to perform parameterizations upon meshes, including generating and using one or more data structures 120 for assisting in this parameterization, and with any further operations upon the mesh or meshes. Parameterization program 118 can also be included within another computer graphics program to assist in parameterizing meshes for other operations.

Each program described above can be implemented in a high level procedural or object oriented programming language to communicate with a computer system. However, the programs can be implemented in assembly or machine language, if desired. In any case, the language can be a compiled or interpreted language. Each such program can be stored on a storage medium or device (e.g., DID, CD-ROM, hard disk or magnetic diskette) that is readable by a general or special purpose programmable computer for configuring and operating the computer when the storage medium or device is read by the computer to perform the procedures described in this document. The system can also be considered to be implemented as a computer-readable storage medium, configured with a computer program, where the storage medium so configured causes a computer to operate in a specific and predefined manner. Parameterization program 118 can also be included within another computer graphics program to assist in parameterizing meshes for other operations.

Other embodiments are within the scope of the claims. For example, a number of different types of base meshes can be parameterized in this manner, including surfaces composed of Penrose tiles or pentagonal, hexagonal, octagonal faces, or combinations thereof. Different procedures can be used, written in a number of different programming languages, and being executed in different orders, to arrive at the same results.

What is claimed is:

1. A method for parameterizing a subdivision mesh in a computer system, the subdivision mesh comprising at least two faces, at least two faces sharing an edge, the method comprising:

assigning a unique index to each of the at least two faces;

assigning, for each of the at least two faces, a first (u) and a second (v) parameter; and at a vertex shared by two faces sharing an edge, setting a first bound for each of the u and v parameters for each of the two faces, and for each of the same two faces, at a respective vertex not shared by the two faces, setting a second bound for each of the u and v parameters.

2. The method of claim 1 wherein the first bound is the same for the u and v parameters for each of the two faces, and the second bound is the same for the u and v parameters for each of the two faces.

3. The method of claim 2 wherein the first bound is a minimum bound and the second bound is a maximum bound for each of the parameters u and v.

4. The method of claim 2 wherein the first bound is a maximum bound and the second bound is a minimum bound for each of the parameters u and v.

5. The method of claim 3 wherein the first bound is 0 and the second bound is 1.

6. The method of claim 4 wherein the first bound is 1 and the second bound is 0.

7. The method of claim 1 wherein each face is a quad.

8. The method of claim 7 wherein each non-shared vertex is diagonal from and opposite of the respective shared vertex for each face.

9. The method claim 1 further comprising, for substantially all faces of the subdivision mesh:

assigning a unique index to substantially all of the faces;

assigning, for substantially all of the faces, a first (u) and a second (v) parameter; and for each pair of faces sharing an edge, at a vertex shared by two faces, setting a first bound for each of the u and v parameters for each of the two faces, and for each of the same two faces, at a respective vertex not shared by the two faces, setting a second bound for each of the u and v parameters.

10. The method of claim 1 further comprising:

determining whether a point lies on a boundary between two or more coupled faces; and assigning, to the shared point, the u and v parameters and the index from the coupled face which has the lowest index.

11. The method of claim 1 further comprising:

determining whether a point lies on a boundary between two or more coupled faces; and assigning, to the shared point, the u and v parameters and the index from the coupled face which has the highest index.

12. The method of claim 1 further comprising:
initially parameterizing a point on a local face using a first adjacent parameter value and a second adjacent parameter value determined from the u and v parameters of an adjacent face; and
determining a local parameterization of the point by:
assigning to the point the index of the local face, and swapping the first adjacent parameter value to become the second local parameter value, and swapping the second adjacent parameter value to become the first local parameter value.

13. The method of claim 12 further comprising:
if the first local parameter value is greater than the maximum bound of the second parameter of the adjacent face, then subtracting the first local parameter value from twice the maximum bound of the second parameter of the adjacent face, and assigning the result as the new first local parameter value;
if the first local parameter value is less than the minimum bound of the second parameter of the adjacent face, then subtracting the first local parameter value from the minimum bound of the second parameter of the adjacent face, and assigning the result as the new first local parameter value;
if the second local parameter value is greater than the maximum bound of the first parameter of the adjacent face, then subtracting the second local parameter value from twice the maximum bound of the first parameter of the adjacent face, and assigning the result as the new second local parameter value; and
if the second local parameter value is less than the minimum bound of the first parameter of the adjacent face, then subtracting the second local parameter value from the minimum value of the first parameter of the adjacent face, and assigning the result as the new second local parameter value.

14. A storage device tangibly storing a control program, the control program, when coupled to a control device, operating the control device to perform the function of parameterizing a subdivision mesh, the subdivision mesh comprising at least two faces, at least two faces sharing an edge, by:
assigning a unique index to each of the at least two faces;
assigning, for each of the at least two faces, a first (u) and a second (v) parameter; and
at a vertex shared by two faces sharing an edge, setting a first bound for each of the u and v parameters for each of the two faces, and for each of the same two faces, at a respective vertex not shared by the two faces, setting a second bound for each of the u and v parameters.

15. The storage device of claim 14 wherein the first bound is the same for the u and v parameters for each of the two faces, and the second bound is the same for the u and v parameters for each of the two faces.

16. The storage device of claim 15 wherein the first bound is a minimum bound and the second bound is a maximum bound for each of the parameters u and v.

17. The storage device of claim 15 wherein the first bound is a maximum bound and the second bound is a minimum bound for each of the parameters u and v.

18. The storage device of claim 16 wherein the first bound is 0 and the second bound is 1.

19. The storage device of claim 17 wherein the first bound is 1 and the second bound is 0.

20. The storage device of claim 14 wherein each face is a quad.

21. The storage device of claim 20 wherein each non-shared vertex is diagonal from and opposite of the respective shared vertex for each face.

22. The storage device of claim 14 wherein the function of parameterizing the subdivision mesh further comprises, for substantial all faces of the subdivision mesh:
assigning a unique index for substantially all of the faces;
assigning, for substantially all of the faces, a first (u) and a second (v) parameter to uniquely parameterize each point on a respective face; and
for each pair of faces sharing an edge, at a vertex shared by two faces, setting a first bound for each of the u and v parameters for each of the two faces, and for each of the same two faces, at a respective vertex not shared by the two faces, setting a second bound for each of the u and v parameters.

23. The storage device of claim 14 wherein the function of parameterizing the subdivision mesh further comprises:
determining whether a point lies on a boundary between two or more coupled faces; and
assigning, to the shared point, the u and v parameters and the index from the coupled face which has the lowest index.

24. The storage device of claim 14 wherein the function of parameterizing the subdivision mesh further comprises:
determining whether a point lies on a boundary between two or more coupled faces; and
assigning, to the shared point, the u and v parameters and the index from the coupled face which has the highest index.

25. The storage device of claim 14 wherein the function of parameterizing the subdivision mesh further comprises:
initially parameterizing a point on a local face using a first adjacent parameter value and a second adjacent parameter value determined from the u and v parameters of an adjacent face; and
determining a local parameterization of the point by:
assigning to the point the index of the local face, and swapping the first adjacent parameter value to become the second local parameter value, and swapping the second adjacent parameter value to become the first local parameter value.

26. The storage device of claim 25 wherein the function of parameterizing the subdivision mesh further comprises:
if the first local parameter value is greater than the maximum bound of the second parameter of the adjacent face, then subtracting the first local parameter value from twice the maximum bound of the second parameter of the adjacent face, and assigning the result as the new first local parameter value;
if the first local parameter value is less than the minimum bound of the second parameter of the adjacent face, then subtracting the first local parameter value from the minimum bound of the second parameter of the adjacent face, and assigning the result as the new first local parameter value;
if the second local parameter value is greater than the maximum bound of the first parameter of the adjacent face, then subtracting the second local parameter value from twice the maximum bound of the first parameter of the adjacent face, and assigning the result as the new second local parameter value; and
if the second local parameter value is less than the minimum bound of the first parameter of the adjacent face, then subtracting the second local parameter value from the minimum value of the first parameter of the adjacent face, and assigning the result as the new second local parameter value.

* * * * *